United States Patent [19]

Drori

[11] 4,271,018
[45] Jun. 2, 1981

[54] BACKWASHABLE FLUID FILTERS
[76] Inventor: Mordeki Drori, 89 Zahal Street, Kiron, Israel
[21] Appl. No.: 74,525
[22] Filed: Sep. 11, 1979
[30] Foreign Application Priority Data
Sep. 22, 1978 [IL] Israel .................................. 55622
[51] Int. Cl.³ ........................................... B01D 33/06
[52] U.S. Cl. ................................... 210/107; 210/108; 210/354; 210/411
[58] Field of Search ............... 210/107, 108, 354, 411, 210/436, 437, 448

[56] References Cited
U.S. PATENT DOCUMENTS

| 913,636 | 2/1909 | Gardiner | 210/354 X |
| 2,608,952 | 9/1952 | Herbert | 210/354 X |
| 2,946,447 | 7/1960 | Welz | 210/354 X |
| 3,338,416 | 8/1967 | Barry | 210/354 X |
| 3,882,025 | 5/1975 | Talley, Jr. | 210/354 |
| 4,042,504 | 8/1977 | Drori | 210/107 |
| 4,045,345 | 8/1977 | Drori | 210/107 |
| 4,060,483 | 11/1977 | Barzuza | 210/79 |

FOREIGN PATENT DOCUMENTS

| 1213823 | 4/1966 | Fed. Rep. of Germany | 210/354 |
| 51892 | 5/1943 | France | 210/354 |
| 63142 | 1/1941 | Norway | 210/354 |
| 563832 | 8/1944 | United Kingdom . | |

Primary Examiner—Robert H. Spitzer
Attorney, Agent, or Firm—Benjamin J. Barish

[57] ABSTRACT

A backwashable filtering device is described comprising a housing having a filter body and a backwash nozzle disposed therein, characterized in that the backwash nozzle is fixed with respect to the housing, the filter body is rotatably mounted with respect to the backwash nozzle, and the filtering device further includes a rotor and gear drive means rotating the filter body by the energy of the backwash fluid flowing through the nozzle.

8 Claims, 4 Drawing Figures

BACKWASHABLE FLUID FILTERS

BACKGROUND OF THE INVENTION

The present invention relates to filters and particularly to filters which are cleaned by backwashing.

The cleaning of conventional filters, such as those commonly included in water irrigation systems, usually involves shutting-off the supply line, dismantling the filter, cleaning its parts, and then re-assembling it. Such a procedure is very inconvenient, time-consuming, and costly. A number of backwashing filters have been developed for cleaning the filter without dismantling it.

One such filter as described in my prior U.S. Pat. No. 4,045,345, comprises a housing including an inlet connectable to an upstream fluid pipe, and an outlet connectable to a downstream fluid pipe; a filter body disposed within the housing and having an upstream surface on the housing inlet side thereof to intercept dirt particles in the fluid flowing in the forward direction through the filter body from the housing inlet to the housing outlet; and a backwash nozzle having an inlet opening disposed adjacent to said upstream surface of the filter body for backwashing the filter body. In the construction described in that patent, the backwash nozzle is rotated by the backwashed fluid with respect to the filter body, which body is fixed to the housing.

BRIEF SUMMARY OF THE INVENTION

According to the present invention, there is provided a backwashable filtering device of the above type but characterized in that: the backwash nozzle is fixed with respect to the housing, the filter body is mounted for movement with respect to the backwash nozzle, and the filtering device further includes drive means for rotating the filter body to enable the nozzle to scan substantially the complete upstream surface of the filter body. For this purpose, the filter body is provided with teeth annularly around one end thereof. Also a rotor is provided within the housing which rotor has blades in the path of the fluid flowing through the nozzle so as to be rotated thereby. The rotor is coupled to a gear within the housing, which gear is in turn coupled to the teeth on the filter body to rotate it relative to the nozzle by the fluid flowing through the nozzle. I have found that such an arrangement produces a number of important advantages, as will be described more particularly below.

In the described embodiment, the filter body is a rotary cylinder; also the drive means comprises a rotor having blades in the path of the fluid flowing through the nozzle so as to be rotated thereby, and gear means coupling the rotor to the filter body to rotate same by the energy of the backwash fluid flowing through said nozzle.

BRIEF DESCRIPTION OF THE DRAWINGS

The invention is herein described, by way of example only, with reference to the accompanying drawings wherein.

DESCRIPTION OF A PREFERRED EMBODIMENT

Figure 1:
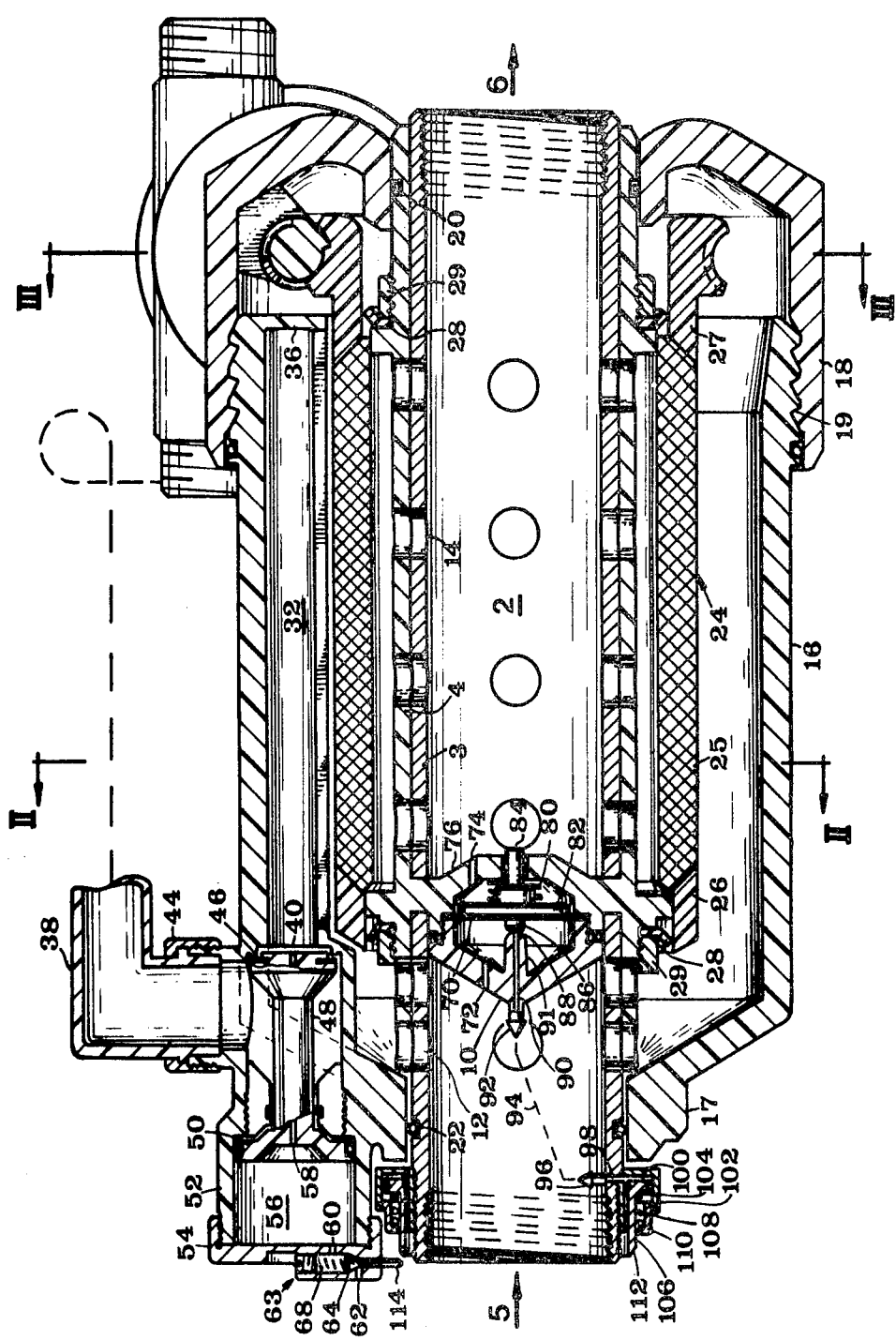
FIG. 1 is a longitudinal sectional view of one form of backwashable filtering device constructed in accordance with the present invention.

The backwashable filtering device illustrated in the drawings is of the in-line type described in my U.S. Pat. No. 4,045,345. It includes a housing comprising an inner tubular section 2 constituted of a rigid metal tube 3 and a plastic body 4 bonded thereto. The opposite ends of metal tube 3 serve as the inlet 5 and the outlet 6 of the filter housing, and are adapted to be threadedly attached to the upstream and downstream pipes (not shown), respectively. A conical deflector 10 is fixed within the inner metal tube 3 between one group of holes 12 and a second group of holes 14 formed through the wall of the tubular housing section 2 at longitudinally-spaced locations.

The filter housing further includes an outer cylindrical section 16 which is radially spaced from the inner tubular section 2. The upstream (left) end 17 of housing section 16 is formed with a bore receiving the respective end of the inner housing section 2. The downstream (right) end of the housing section 2 is closed by a collar 18 threaded at 19, and is formed with a bore receiving the respective end of the inner housing section 2. The two ends of the outer housing section 16 are sealed by seals 20, 22 with respect to the inner housing section 2.

A filter body 24 of substantially cylindrical configuration is disposed in the space between the inner housing section 2 and the outer housing section 16. Filter body 24 includes a filter element 25 of any suitable kind (e.g. mesh screen, filter discs, or the like), and carries a pair of plastic sleeves 26, 27 fixed to it at its opposite ends. The latter ends are rotatably mounted with respect to the inner housing section 2 on plastic bearing seals 28 secured to the inner housing section by threaded collars 29.

Figure 2:
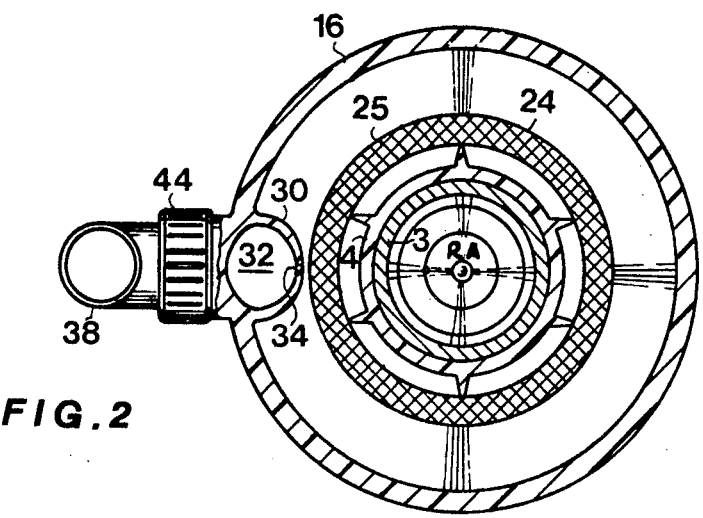
FIG. 2 is a transverse sectional view along lines II—II of FIG. 1.
Figure 3:
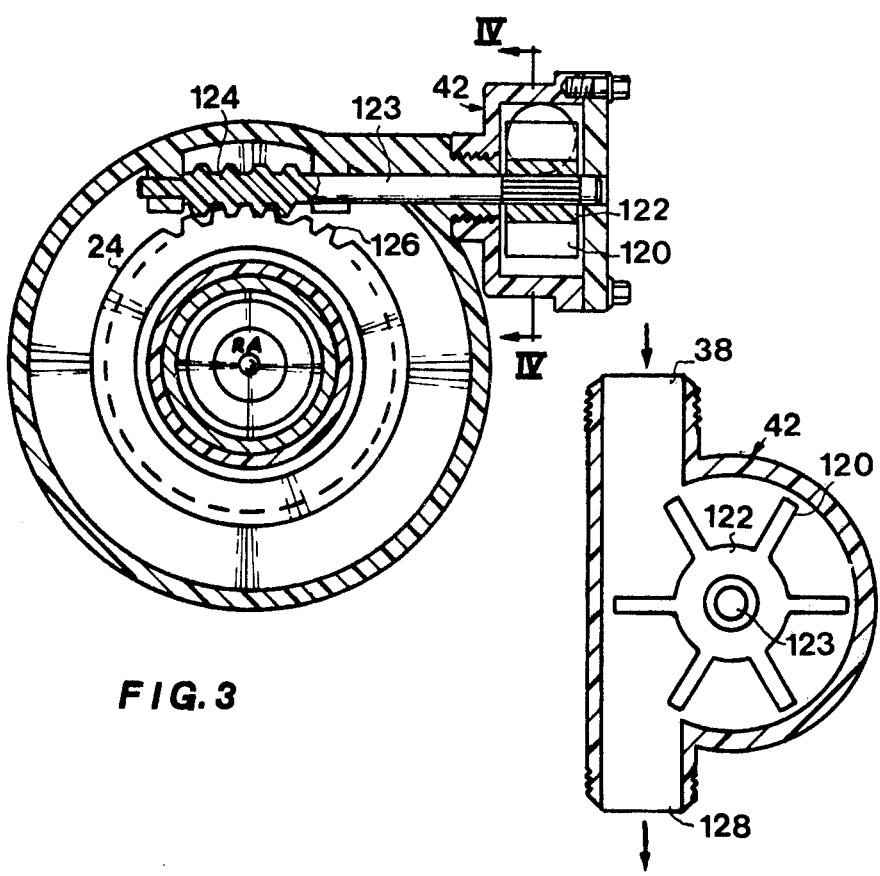
FIG. 3 is a sectional view along lines III—III of FIG. 1.

The outer cylindrical housing section 16 is provided with an inwardly-depending curved wall 30 (see particularly FIG. 2) defining a purging chamber 32 formed with a narrow inlet opening 34 adjacent to, and extending the complete length of, the outer cylindrical surface of the filter body 24. Purging chamber 32 with its narrow inlet 34 serves as a backwash nozzle which is effective to clean the upstream (outer) cylindrical surface of the filter body as the filter body is rotated with respect to the housing, as will be described more particularly below. One end of backwash nozzle 32 is closed by end wall 36, and the opposite end communicates with a purging conduit 38 via circular opening or passageway 40. Purging conduit 38, which leads to a fluid drive unit 42, is fixed to the outer housing section 16 by means of a threaded nut 44. The backflush water flowing from nozzle 32 through purging conduit 38 is thus fed to the fluid drive unit 42 and is effective to rotate the filter body 24 by the energy in the backwash fluid, as will be described more particularly below with respect to FIGS. 3 and 4.

A valve member 46 is seatable within opening 40 between purging chamber 32 and its purging conduit 38. Valve member 46 is fixed to one end of a stem 48. The opposite end of the stem carries a piston 50 movable within a cylinder 52 formed at the respective end of the outer housing section 16. Cylinder 52 is closed by a threaded cap 54 whereby a valve chamber 56 is defined by piston 50 movable within cylinder 52. A bore 58 formed through valve member 46, its stem 48, and piston 50, transmits to valve chamber 56 the pressure within the purging chamber 32. This chamber may also be vented to the atmosphere via an opening 60 formed in cap 54, and an opening 62 formed in another cylinder of a pilot valve 63 whose valve member 64 is movable in its cylinder 62 to make, or block, communication between opening 60 and opening 62 of the pilot valve. The pilot valve member 64 is formed with a conical seat such that in its lowermost position, as urged by spring 68, it blocks communication between openings 60 and 62, but it may be moved to an upper position against spring 68 in order to establish communication between openings 60 and 62 and thereby to vent the main valve chamber 56 to the atmosphere.

Pilot valve 63 is automatically actuated to vent chamber 56 to the atmosphere by means of pressure-sensing means which senses the pressure differences between the inlet 5 and the outlet 6 of the filter housing, to automatically initiate a backwash cleaning operation when the pressure difference exceeds a predetermined magnitude, thereby indicating that the filter body 24 is overly clogged with dirt.

The pressure-sensing means includes a diaphragm 70 disposed within deflector 10. Deflector 10 includes an opening 72 exposing the left face of the diaphragm to the pressure at the inlet side 5 of the filter housing. The opposite face of diaphragm 70 is exposed to the pressure at the outlet side 6 of the housing by means of another opening 74 formed through the rear wall 76 of the deflector. Diagragm 70 is spring-urged towards the inlet side of the housing by means of a coil spring 80 interposed between rear wall 76 of the deflector and a circular disc 82 engaging or fixed to the respective face of the diaphragm. Disc 82 includes a guiding stem 84 passing through a central opening formed in rear wall 76 of deflector 10.

The opposite face of diaphragm 70 (i.e., that facing the inlet side 5 of the filter) carries a valve member 86 which is adapted to move into or out of engagement with respect to the mouth 88 of an axial bore 90 formed in a stem 91 of deflector 10. The opposite end of bore 90 is connected to a nipple 92 which receives a control line 94 leading to another nipple 96 carried internally of the inner tubular section 2 of the filter housing.

A bore 98 formed through the wall of housing section 2 leads from nipple 96 to a chamber 100 defined by an annular cylinder 102 threaded onto the inlet end of the filter housing, and an annular flange 104 of a sleeve 106 movable within cylinder 102 against a spring 108 interposed between annular flange 104 and a closure cap 110. The opposite end of sleeve 106 is formed with a cam surface 112 which is engageable with a stem 114 carried at the end of the pilot valve member 64. Thus, whenever chamber 100 is pressurized by the operation of the diaphragm sensor 70 as will be described below, sleeve 106 is moved outwardly to engage the lower end of stem 114 and thereby to move the pilot valve member 64 upwardly, to vent the main valve chamber 56 to the atmosphere via openings 60 and 62. When this occurs, the inlet pressure acting on valve member 46, being unopposed by the pressure within that chamber 56, causes the valve member to move (leftwardly in FIG. 1) to the opening position, thereby opening passageway 40 from the backwash nozzle 32 to the purging conduit 38.

When valve member 46 is thus moved to its open position, the water is backwashed through the filter body 24 via the backwash nozzle 32 and out through purging conduit 38.

The backwash water flowing through conduit 38 is directed to hydraulic drive unit 42 where it impinges the blades 120 fixed at one end of a rotor 122 (FIGS. 3, 4) disposed within that unit. Rotor 122 includes a shaft 123 whose opposite end is formed as a worm 124 meshing with gear teeth 126 formed on the outer periphery of end sleeve 27 of the filter body 24. Accordingly, the energy of the backwash water flowing out through purging conduit 38 will effect a rotation of the filter body 24 with respect to backwash nozzle 32, thereby exposing the complete outer cylindrical surface of the filter body, which is at its upstream side, to the backwash nozzle whenever valve member 46 is open.

The filter illustrated in FIGS. 1-4 operates as follows: In the normal use of the filter, the water following through inlet 5 passes via openings 12 through the filter body 24, and exits via openings 14 through the outlet 6. So long as the filter body 24 is reasonably clean, there is but a small drop in pressure during this forward flow of the water through the filter body, and therefore the pressure at the outlet 6 will be but slightly below that at the inlet 5. Diaphragm 70 senses the difference in pressure between the inlet and outlet, via openings 72, 74, respectively, and spring 80 is designed so that valve member 86 carried centrally of diaphragm 70 is in contact with mount 88 of bore 90 at all times that the pressure difference between the inlet and outlet is below a predetermined amount, i.e. when the filter is reasonably clean. Accordingly, during this normal operation of the filter, chamber 100 will not be pressurized, and pilot valve member 64 will be in the illustrated lower position whereby the main valve chamber 56 is not vented to the atmosphere. The pressure within chamber 56 will therefore be equal to that in the backwash nozzle 32, by virtue of bore 58 establishing communication between the two. Because of the larger cross-sectional area of piston 50, compared to that of the main valve member 46, the main valve member 46 will be seated in opening 40, as illustrated in FIG. 1, thereby blocking the flow of water from backwash nozzle 32 to the purging outlet conduit 38.

Thus, in this normal operation, the flow of water out through the purging conduit 38 will be blocked, and the filter will operate to filter out the dirt particles in the water flowing in the above-described forward direction through the filter from inlet 5 through outlet 6.

Now, as the dirt particles accumulate on the filter body 24, particularly on its upstream surface 25 facing the inlet 5, the difference in pressure between the inlet 5 and the outlet 6, increases until it reaches a predetermined magnitude whereupon diaphragm 70 flexes (rightwardly) to move its valve member 86 away from mouth 88 of bore 90. The inlet water pressure is now applied, via control line 94, to chamber 100, which causes sleeve 106 to move (leftwardly), whereby its outer tapered end 112 engages stem 114 of the pilot valve member 64, thereby raising it against spring 68. When this occurs, the main valve chamber 56 becomes vented to the atmosphere via openings 60, 62, so that the main valve member 46 now moves (leftwardly) away from opening 40, thereby establishing communication between backwash nozzle 32 and purging conduit 38. This causes the backwash nozzle 32 to be vented to the atmosphere, as will be described below, whereupon a reverse flow of water is produced via openings 14, filter body 24, backwash nozzle 32, and purging conduit 38 which flushes the dirt particles from the filter body out through the backwash nozzle 32 and the purging conduit 38.

Figure 4:
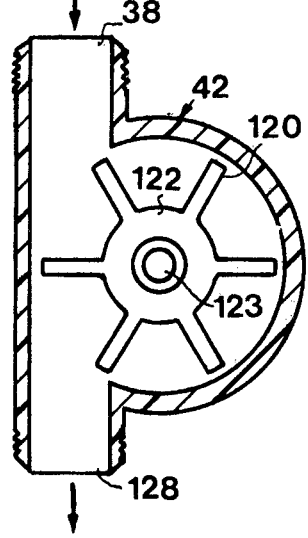
FIG. 4 is a sectional view along lines IV—IV of FIG. 3.

The dirty water from the backwash nozzle 32 and purging conduit 38 is directed to flow to the hydraulic drive unit 42 so that the kinetic energy in this water is exploited to rotate the filter body 24 with respect to the fixed backwash nozzle 32 carried by the fixed housing section 16. More particularly, the dirty water entering the hydraulic drive unit 42 from conduit 38 impinges blades 120 of rotor 122, thereby rotating worm 124 of the rotor shaft 123, which worm in turn rotates gear 126 carried by end sleeve 27 of the filter body 24. The filter body 24 is thus rotated and the dirty water, after its kinetic energy is spent, leaves hydraulic drive unit 42 via outlet opening 128 (FIG. 4).

There are several advantages in the described arrangement in which the filter body is rotated with respect to the backwash nozzle, over an arrangement wherein the backwash nozzle, is rotated with respect to the filter body. Thus, when the filter body is rotated, large dirt particles (e.g. pebbles) which may attach themselves to the outer surface of the filter body would tend to dislodge and drop to the bottom of the housing, thus decreasing the possibility that such pebbles may become lodged between the nozzle and the filter body thereby jamming the nozzle or scraping the filter body. In addition, rotating the filter body alone involves less inertia to be overcome by the kinetic energy of the water, thereby reducing the load on the drive. Further, in the illustrated arrangement the pressure difference on opposite sides of the bearing seals is relatively small, decreasing the frictional loss and thereby further reducing the load on the drive.

What is claimed is:

1. A backwashable filtering device, comprising a housing including an inlet connectable to an upstream fluid pipe, and an outlet connectable to a downstream fluid pipe; a filter body disposed within the housing and having an upstream surface on the housing inlet side thereof to intercept dirt particles in the fluid flowing in the forward direction through the filter body from the housing inlet to the housing outlet; and a backwash nozzle having an inlet opening disposed adjacent to said upstream surface of the filter body for backwashing the filter body; characterized in that: said backwash nozzle is fixed with respect to said housing, said filter body being mounted for rotation with respect to the backwash nozzle and including teeth annularly disposed around one end thereof, a rotor within said housing and having blades in the path of the fluid flowing through the nozzle so as to be rotated thereby, and gear means within said housing and coupling said rotor to said teeth on the filter body to rotate said filter body relative to said nozzle to enable the nozzle inlet opening to scan substantially the complete upstream surface of the filter body.

2. A filtering device according to claim 1, wherein said filter body is cylindrical and is mounted for rotary movement on a pair of bearing seals at its opposite ends, the backwash nozzle being fixed to the inner face of the housing and extending for substantially the complete length of the outer face, constituting the said upstream surface, of the filter body.

3. A filtering device according to claim 2, wherein said housing includes a passageway between said fixed backwash nozzle and said rotor, and a valve closing said passageway but openable to permit flow of the fluid through said nozzle and over said blades of the rotor to effect the rotation of the filter body during the backwashing thereof by said nozzle.

4. A filter device according to claim 1, wherein said gear means comprises a worm gear disposed within said housing and driven by said rotor, said worm gear meshing with said teeth of the filter body.

5. A backwashable filtering device, comprising a housing including an inlet connectable to an upstream fluid pipe, and an outlet connectable to a downstream fluid pipe; a filter body disposed within the housing and having an upstream surface on the housing inlet side thereof to intercept dirt particles in the fluid flowing in the forward direction through the filter body from the housing inlet to the housing outlet; and a backwash nozzle body having an inlet opening disposed adjacent to said upstream surface of the filter body for backwashing the filter body; characterized in that said filtering device further includes drive means for rotating said filter body with respect to said nozzle body to enable the nozzle inlet opening to scan substantially the complete upstream surface of the filter body, which drive means comprises a rotor having blades disposed within said housing in the path of the fluid flowing through the nozzle body so as to be rotated thereby, gear teeth formed at one end of said filter body, and gear means disposed within said housing and coupling said rotor to said gear teeth to rotate the filter body by the energy of the backwash fluid flowing through said nozzle body.

6. A filtering device according to claim 5, wherein said filter body is cylindrical and is mounted for rotary movement on a pair of bearing seals at its opposite ends, the backwash nozzle being fixed to the inner face of the housing and extending for substantially the complete length of the outer face, constituting the said upstream surface, of the filter body.

7. A filtering device according to claim 6, wherein said cylindrical filter body is rotatably mounted on an inner tubular housing section whose opposite ends serve as said housing inlet and outlet, said inner tubular housing section including a deflector fixed therein between a first group of holes formed through the inner tubular housing section establishing communication from said inlet to the outer surface of the filter body, and a second group of holes formed through the inner tubular housing section establishing communication from the inner surface of the filter body to said outlet.

8. A filtering device according to claim 7, wherein said housing includes a passageway between said fixed backwash nozzle and said rotor, a valve closing said passageway but openable to permit flow of fluid through said nozzle and over said blades of the rotor to effect the rotation of the filter body during the backwashing thereof by said nozzle, and a pressure sensor sensing the differential-pressure between said inner and outer surfaces of the filter body and controlling said valve in response thereto.

* * * * *